Figure 1:
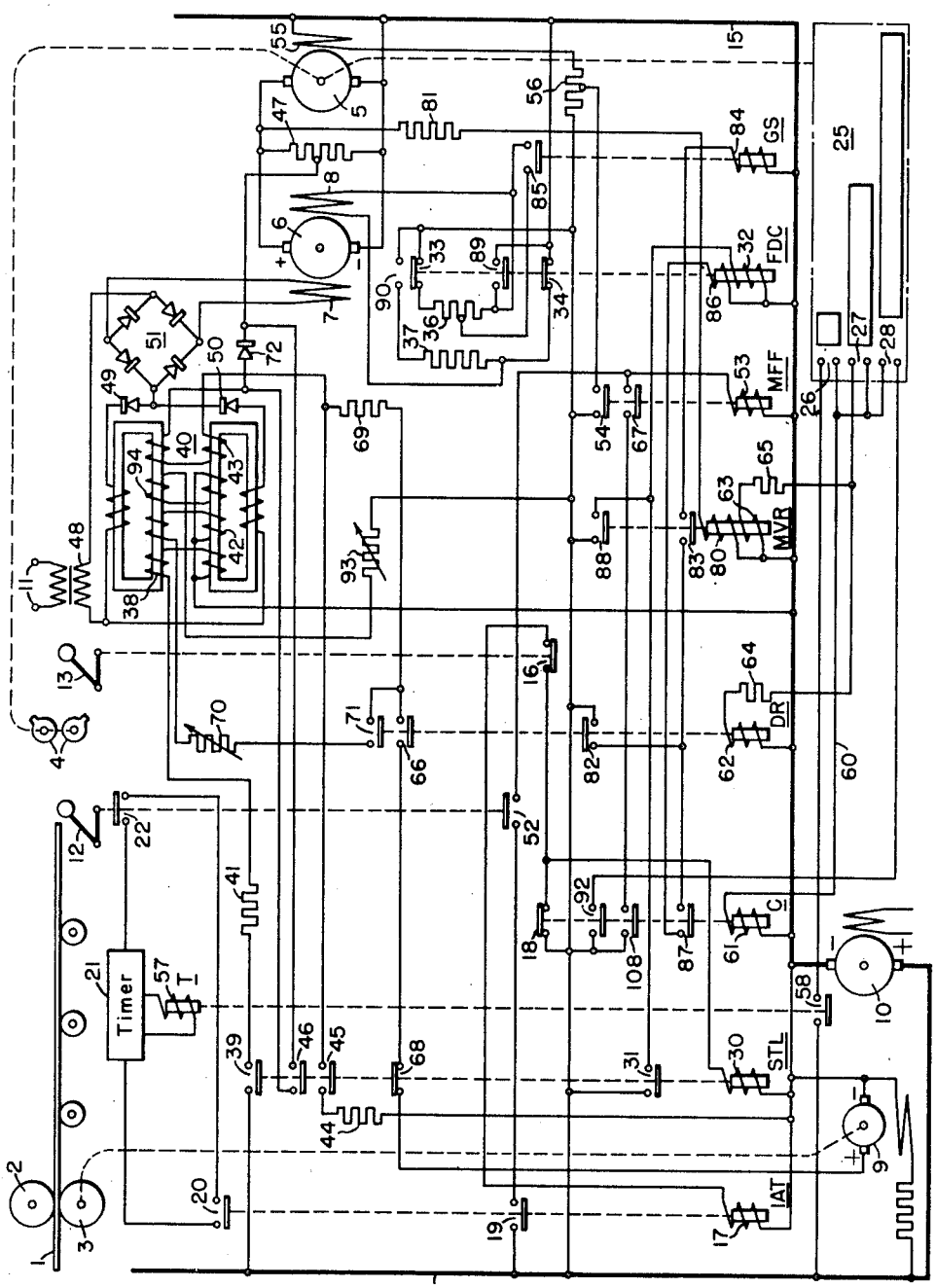

INVENTOR
Alan C. Horner.

United States Patent Office 2,785,358
Patented Mar. 12, 1957

2,785,358

WARD LEONARD CONTROL FOR FLYING-CROP SHEAR

Alan C. Horner, Hamilton, Ontario, Canada, assignor to Canadian Westinghouse Company, Ltd., Hamilton, Ontario, Canada Application April 21, 1955, Serial No. 503,001

Claims priority, application Canada June 16, 1954

6 Claims. (Cl. 318—142)

This invention relates to a motor control system, and more particularly to a Ward-Leonard type of control system for rapidly accelerating and decelerating a motor.

One of the common uses for a control system, according to my invention, is for the operation of a direct coupled flying shear. The operation of such a shear requires that the blades accelerate from rest to a speed equal to the speed of the material being sheared and stop before making a second cut. When the shaft of the driving motor is coupled directly to the blades it is apparent that the motor must accelerate from rest to its maximum speed and then decelerate to a stop all within one revolution motor. If geared coupling is utilized, the motor may make more than one revolution.

Previous systems for accomplishing such a motor control have included voltage regulators. The total permissible time for the shear operation has been of the order of .6 second, the time for the motor to accelerate from rest to full speed being about .2 second. Systems using voltage regulators were found unsatisfactory since the regulators were incapable of operation at such speeds.

The use of such regulators is avoided in U. S. patent application Serial No. 225,186 filed May 8, 1951, of W. T. Hunt et al., entitled "Control for Flying-Crop Shear," now Patent No. 2,728,040, assigned to the Westinghouse Electric Corporation, by utilizing a Ward-Leonard system similar to the one herein disclosed. The system of the above-identified application, Serial No. 225,186, while highly satisfactory for the purpose for which it was originally contemplated has developed certain shortcomings with the advent of flying shears having ever-higher speed requirements. These shortcomings have been particularly evident in those applications wherein extremely precise actuation (in point of time) of the flying shears is required. More particularly, in the system described in patent application Serial No. 225,186, the transition from forced acceleration to leveling off of motor speed is accomplished by means of a voltage relay which detects the point at which the shear generator approaches peak voltage. If the voltage setting on this relay drifts upward, then an excessive voltage peak is reached and excessive motor current results. If, on the other hand, the voltage setting on this relay drifts downward, then the motor is slow in accelerating and the shear will cut improperly. The contacts of this relay are in series with an inductive circuit and are thus subject to arcing. If the arc is not promptly extinguished, the generator voltage tends to peak above the required voltage because the forcing current is still present while the arc persists. Variations in arcing times in the neighborhood of .05 second are to be expected and such variations will have an appreciable effect on the operation of the shear. The multiplicity of the relays in the system and the extremely fast operation of the control sequence is a problem to the maintenance electricians, so that the frequent maintenance requirements of the Hunt et al. control system can become quite serious with a machine having high output requirements.

It is an object of my invention to accelerate a motor from rest to full speed during a fraction of a single rotation of the armature, maintain the armature at full speed for a small fraction of the one rotation, and decelerate the motor armature to a position of rest in the remaining fraction of one rotation.

It is a further object of my invention to provide a motor control system as described above which has a minimum of maintenance requirements and one which once adjusted will readily maintain its operating characteristics.

Figure 2:
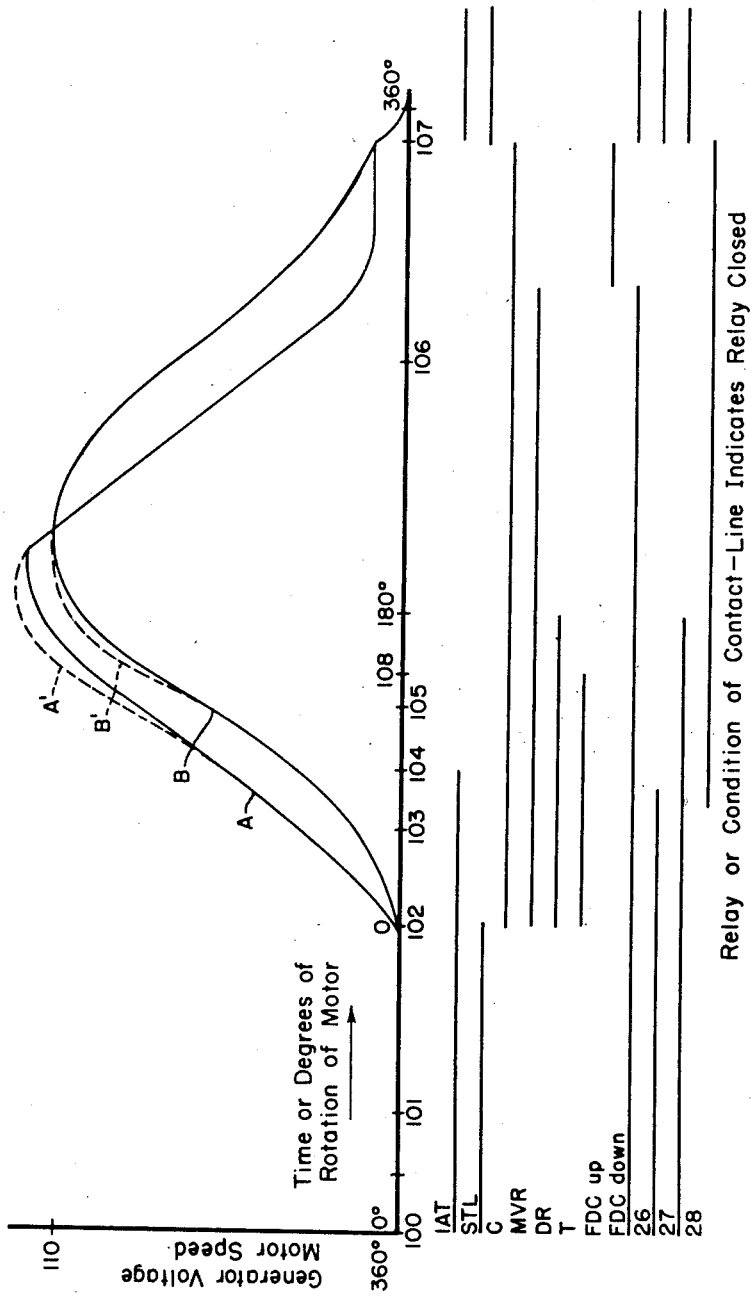
Figure 3:
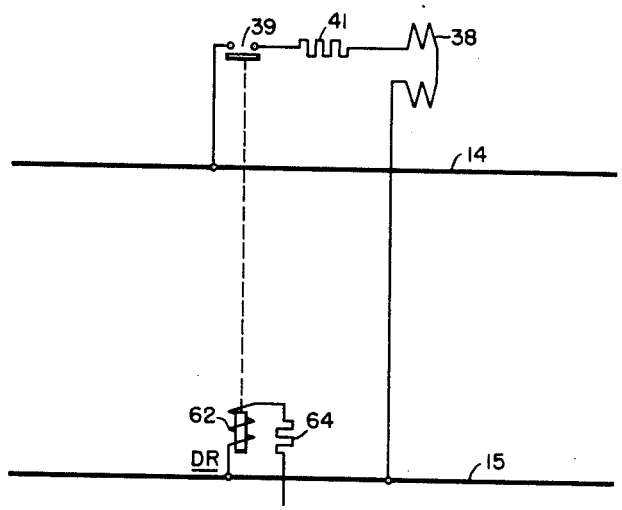
Figure 4:
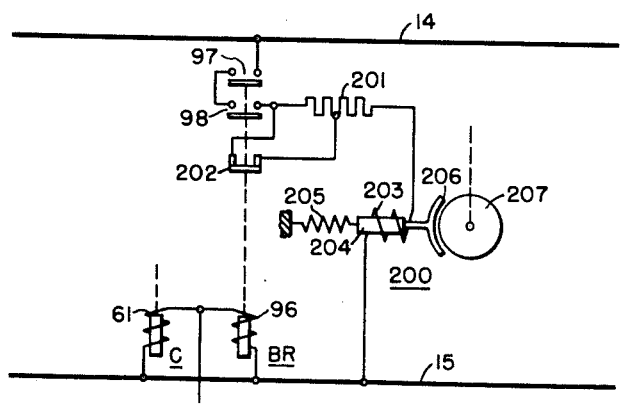

A clearer understanding of the operation and objects of my invention may be had from the following description of one specific application together with the accompanying drawings, in which:

Figure 1 is a schematic diagram of my control system applied to a flying shear, and Fig. 2 is a graphical representation of some of the characteristics of the system and the coincident relay operation; and Figs. 3 and 4 are schematic diagrams of modifications applicable to my system.

Considering first Fig. 1, there is shown a billet 1 passing through the last stand 2 and 3 of a mill to a flying shear 4 driven by motor 5. The armature of motor 5 is connected in a loop circuit with the armature of generator 6 which has two field windings 7 and 8.

A pilot generator 9 is mechanically coupled to the last mill stand so that the potential developed by 9 is proportional to the speed of 2 and 3.

Two potential sources are required for operation of the system, one being a D. C. constant voltage supply that is provided by generator 10, and the other being a constant alternating voltage source that is connected to terminals 11. Flag switches 12 and 13 control the operation of the system in response to the position of the billet.

My invention may be best understood by a cycle of operation of the system assuming the mill to be in operation with generators 6 and 10 driven from a suitable prime mover.

With no rod in the mill, flag switch 13 is normal and the contacts 16 thereof are closed. A circuit is then complete from positive bus 14 through the contacts 18 of relay C through contacts 16 of flag switch 13 and coil 17 of relay IAT to the negative bus 15. Relay IAT, therefore, is actuated thereby closing contacts 19 and 20.

The closed contacts 18 also provide an energizing circuit for relay STL from bus 14 through contacts 18 and coil 30 of relay STL to bus 15. Actuation of STL closes contacts 31 which complete a circuit from bus 14 through contacts 31 and through coil 32 of relay FDC to bus 15. This holds relay FDC in its lower operating condition until coil 32 is de-energized since relay FDC is designed so that it will not change from one condition to the other until the coil holding it in position is de-energized and the opposite coil energized. In its lower condition, relay FDC closes contacts 33 and 34 completing the circuit of field 8 of generator 6 from bus 15 through contacts 34, field 8, resistor 36, contacts 33 to bus 14. This energizes generator 6 in a negative direction.

The actuation of relay STL also completes a circuit for coil 38 of magnetic amplifier 40 in a positive sense from bus 14 through contacts 39, resistor 41, coil 38 to bus 15. It also completes a circuit for coil 43 of the magnetic amplifier in a negative sense from bus 14 through resistor 44, contacts 45, coil 43, contacts 46 to a tap on resistor 47 which is across the terminals of generator 6. Self-saturating magnetic amplifier 40 is supplied with alternating current from transformer 48 through rectifiers 49 and 50 and bridge rectifier 51. It is also provided with a biasing potential from bus 14 through resistor 93 and coil 94 to bus 15, adjusted so that the current through the amplifier is essentially zero when the net ampere turns in coils 38, 42 and 43 is equal to zero. The current through the amplifier 40 determines the output of rectifier 51 which is connected to field 7 of generator 6 in a positive sense. The field 7, therefore, opposes field 8 and a proper selection of resistors 41, 44 and 36 ensures that the output of generator 6 is zero volts. Any potential appearing across the generator terminals is applied to coil 43 from the tap on resistor 47 in such a polarity as to cause the current in field 7 to be corrected to produce zero voltage output.

When a bar comes through the mill, it strikes flag switch 12 closing contacts 22. A circuit is then completed for the timer 21 (which is a passive electrical network employing capacitors or inductors such as is well known in the art) through contacts 20 of relay IAT and contacts 22 of the flag switch 12 and the timer commences its timing operation. A circuit is also completed from bus 14 through contacts 52 of flag switch 12, contacts 19 of relay IAT and the coil 53 of relay MFF. This actuates relay MFF closing contacts 54. The field 55 of motor 5 has been supplied with current from bus 14 through resistor 56 through field 55 to bus 15. When contacts 54 close, a portion of resistor 56 is shorted out increasing the motor field current and ensuring maximum torque for any value of motor armature current.

When timer 21 completes its timing cycle, the relay T is actuated by energizing coil 57, closing contacts 58. This completes a circuit from bus 15 through contacts 58 and contacts 26 of limit switch 25 to bus 60. The coil 61 of relay C is then energized from bus 15 through coil 61 to bus 60 actuating relay C and opening contacts 18. This opens the circuits of coils 30 and 17 on relays STL and IAT. STL drops out immediately but IAT is a delayed release type of relay and does not open immediately.

The energizing of bus 60 also completes the circuits of coils 62 and 63 of relays DR and MVR through contacts 27 of switch 25 and resistors 64 and 65, respectively.

Actuation of relay C completes the circuit from bus 14 through contacts 108 of relay C and contacts 67 of relay MFF through coil 53 of MFF to bus 15. This holds relay MFF actuated after relay IAT is de-energized.

Actuation of relay DR closes contacts 66 and 71 and completes the circuit of coil 43 of the magnetic amplifier from the positive polarity terminal of pilot generator 9 through contacts 68 of relay STL which is now de-energized, through contacts 66, resistor 69 and coil 43, rectifier 72 to a point on resistor 47 near the positive terminal of generator 6. It should be noted that the negative terminals of all the generators are connected to negative bus 15. Since the voltage of the pilot generator is greater than the voltage in generator 6, which up to this point was held at zero, a current flows through coil 43 in a positive sense. Closing of contacts 71 also completes a circuit from the positive terminal of generator 9 through contacts 68 of relay STL, contacts 66 and 71 of relay DR, resistor 70 through coil 42 of the magnetic amplifier to the negative bus 15. This causes a current to flow through coil 42 in a positive sense. The de-energizing of STL also opens contacts 39 de-energizing winding 38 which previously had been energized in a positive direction. As a result, windings 42 and 43 reinforce each other and the field 7 of generator 6 is rapidly energized causing the voltage of generator 6 to rise rapidly as shown in Fig. 2 followed by the motor 5 which rapidly accelerates. The rate of rise of voltage is, of course, limited by the inductance of the generator field and the magnetic amplifier windings.

As the generator voltage rises, the voltage drop across resistor 47 increases. But coil 43 is supplied with a current proportional to the difference between the voltage of generator 9 and the voltage at the tap on resistor 47.

As the voltage across resistor 47 rises, the current through coil 43 drops which reduces the output of the magnetic amplifier and hence reduces the current in field 7. The degree of forcing, i. e. rate of motor acceleration, therefore, decreases as the operating speed is approached. The adjustment of resistor 70 determines the ultimate speed of the motor since as the generator approaches its maximum voltage, the voltage at the tap on resistor 47 exceeds the voltage output of generator 9 but rectifier 72 prohibits current from flowing in a reverse direction, therefore, the current in coil 43 is zero. The only determining factor at or near maximum speed is, therefore, the current in coil 42 and this current is adjusted to give a shear speed equal to or slightly exceeding the rod speed.

The control of the overshoot of shear speed is accomplished by varying the tap on resistor 47. The ultimate voltage attained by generator 6 is controlled by the relation between the voltage developed at the tap on resistor 47 and the voltage developed at generator 9 and hence by adjusting the tap, the overshoot may be adjusted. A small amount of overshoot is necessary since the acceleration of the motor lags behind the generator voltage.

As the motor rotates, it drives limit switch 25 and contact 26 is opened after a few degrees of rotation. Bus 60, however, is still energized from bus 14 through contact 92 of relay C and contact 28 of the limit switch which is now closed. This sets up relay C so that it is ready to drop out as soon as contacts 28 open near the completion of a 360° rotation.

As will be noted, the shear blades 4 and motor 5 are connected on a common shaft. The shear motor attains the desired speed and the shears make their cut at 180° at which point contacts 27 of limit switch 25 have just opened.

When contacts 27 open, relay coils 62 and 63 are de-energized. Relay DR, therefore, drops out but relay MVR is held by coil 80 which is supplied from the positive terminal of generator 6 through resistor 81 and coil 80 to negative bus 15 as long as a voltage is developed across generator 6.

When relay DR drops out, contacts 66 and 71 open de-energizing coils 43 and 42 of the magnetic amplifier. The output of the amplifier drops to a minimum and the field 7 of the generator 6 discharges through rectifier 51. Field 8 is still energized in a negative direction and when the field 7 decreases, the effect of field 8 is to cause the voltage of the generator to decrease rapidly. To assist this action, a circuit is completed through contacts 82 of relay DR, contacts 83 of MVR and coil 84 of relay GS to bus 15 causing relay GS to energize and close contacts 85 which short out a portion of resistor 36 in the circuit of field 8. The de-energizing of relay DR and closing of contact 82 also completes a circuit through contacts 87 of C, coil 86 of FDC to bus 15. This energizes the upper coil, but FDC is so designed that it cannot switch until coil 32 is de-energized.

When the voltage of generator 6 reaches a certain minimum value, relay MVR drops out, opening the circuit of coil 84 and permitting GS to drop out which reinserts the whole of resistor 36 in the field circuit. Simultaneously, contacts 88 open the circuit from bus 15 to coil 32 to bus 15 de-energizing the lower coil 32 of FDC which switches over opening contacts 33 and 34 and closing 89 and 90.

This is a reversing switch which reverses the current direction in field 8 causing the generator to generate a small constant voltage determined by the value of resistor 37 in the field circuit causing motor 5 to continue to rotate slowly in its normal direction.

When the shear motor has completed a 360° rotation, the contacts 28 of the limit switch open, de-energizing the coil 61 of relay C, permitting relay C to open closing contacts 18 and re-energizing the coils 17 and 30 of relays IAT and STL.

During the cycle recited above, before the shear made its cut, delay relay IAT timed out opening the timer circuit permitting the timer to reset.

A second flag switch 13 opens contacts 16 as long as a rod is present, preventing a second operation of the shear by opening the circuit of coil 17 until the end of the rod is clear of the shear.

A second operation of the shear could be initiated by flag switch 13, so that the end of the rod is also sheared by the shear, by adding the necessary contacts to this flag switch comparable to the contacts of flag switch 12.

In Fig. 2, curve A represents generator voltage versus time, while curve B represents motor speed versus time.

At point 100, relays IAT and STL are closed, at point 101 the flag switch closes while at point 102 the timer times out and relay T is energized, energizing C and de-energizing STL and IAT. Relays MVR and DR are also closed. At point 104 relay IAT drops out and at 105, the timer resets opening relay T. Just prior to 180° contacts 27 open and relay DR opens up. At 106, contacts 28 open, relay C drops out and relays IAT and STL are re-energized. The motor stops at 360° and the mechanism is reset preparatory to the initiation of a new cycle.

Point 108 is determined by the setting of the movable contact on resistor 47, when the voltage at this point exceeds the voltage produced by the generator 9. Curves A' and B' show the effect of changing this adjustment. Curve A' indicates an overshoot of the generator voltage and produces a more rapid acceleration of the motor as shown at B'. The height of point 110, i. e. the maximum motor speed, is determined by the value of resistor 70.

Fig. 3 illustrates one possible variation of my system. It shows only a small portion of the circuit including relay DR, coil 38 of the magnetic amplifier 40, resistor 41 and buses 14 and 15. In this circuit contacts 39 which in the original drawing were on relay STL have been transferred to relay DR, and the circuit including contacts 39 on relay STL has been deleted. With this circuit, the acceleration is slightly increased over the original circuit since winding 38 is energized in a positive sense during the acceleration period, and is only open circuited when relay DR drops out.

Fig. 4 shows a further modification of my circuit which incorporates a brake mechanism to positively determine the rest position of the shear blades. This is accomplished by the addition of a mechanical brake 200 comprising a solenoid 203, an armature 204 and a return spring 205 which combine to operate the brake shoe 206, which bears against a brake drum 207 coupled to the shaft of motor 5. Only a small portion of the circuit is shown including buses 14 and 15, relay C as shown previously with a controlled coil 61 and a further relay designated BR having contacts 202, 98 and 97. The coil 96 of relay BR is connected in parallel with the coil of relay C. When relay C is actuated, relay BR is also actuated. Contacts 202, however, are delayed release contacts and remain closed during a portion of the closing operation of relay BR, thus shorting out a portion of resistor 201 and permitting very rapid actuation of the brake solenoid 204. Therefore, when coil 96 is energized, contacts 97 and 98 are closed and a circuit is completed for solenoid 203 through contacts 97, 98, 202 and a portion of resistor 201 and solenoid 203 to bus 15. Upon the completion of the operation of relay BR, contacts 202 open and the circuit for solenoid 203 is completed from bus 14 through contacts 97, 98, resistor 201, solenoid 203 to bus 15. When relay C is de-energized, relay BR is also de-energized. The circuit of solenoid 203 is open circuited and the brake is actuated by the spring causing the brake to be applied at a time designated point 107 on Fig. 2. The motor is, therefore, held at this point prohibiting any possibility of creep in the interval between shear operations.

Numerous variations could be made in the above described arrangement within the scope of my invention. For example, a rotating amplifier could be used to replace magnetic amplifier 40, or the two field windings of generator 6 could be replaced by a single winding connected through a reversing switch similar to FDC and supplied from a magnetic amplifier whose output continues beyond the shear operation time to quickly reduce the generator output and then produce a small output to provide the necessary creep speed. Also a push-pull reversing magnetic amplifier could be used with a reversing relay FDC operating on a winding of the magnetic amplifier to obtain a faster deceleration. Generator field 8 would not be used, field 7 only being necessary and being connected to the magnetic amplifier. Also, additional contacts of relay GS could be used to parallel contacts 45 and 46 of STL to more rapidly reduce the magnetic amplifier output and hence generator field 7 current in the system of Fig. 1 or to reduce the generator voltage in a scheme using a push-pull magnetic amplifier. The invention is therefore not to be restricted to the specific structural details, arrangement of parts or circuit connections set forth, as various modifications thereof may be effected without departing from the spirit of the invention.

I claim as my invention:

1. In an electric system of control, in combination: a motor having an armature for driving a load, a main generator, said motor and generator being connected in a loop circuit, said generator having a field winding with characteristics so that excitation may be built up rapidly, a pilot generator having output proportional to the speed of a machine, an exciter providing a source of constant potential, means to compare the output of the pilot generator to the output of the main generator; means to control the acceleration of said motor armature as a function of the resultant produced by the comparison of the pilot generator voltage and the main generator voltage during the period during which the generator field is being rapidly built up, means to determine the maximum value to which said main generator output rises, means actuated in response to a predetermined angular movement of the armature of said motor to rapidly decrease the output of said main generator by partially reversing said main generator field.

2. In an electric control system, in combination, a motor having an armature for driving a load, a main generator, the armatures of said generator and said motor being connected in a loop circuit, said generator having a field winding with characteristics so that excitation may be built up rapidly, a pilot generator having output proportional to the speed of a machine, means to compare the voltage output of the pilot generator to the voltage output of the main generator and means to control the acceleration of said motor armature as a function of the resultant produced by the comparison of the pilot generator and the main generator voltages during the period in which the generator field is being rapidly built up, means to determine the maximum voltage of said main generator proportional to the voltage of said pilot generator, means actuated in response to a predetermined angular movement of the armature of said motor to rapidly decrease the output of said main generator by reversing a portion of said main generator field, and means responsive to a predetermined minimum output from said main generator to prevent the said last-named output from decreasing further until a further predetermined angular movement of said motor is complete, whereupon the output of said main generator is rapidly reduced to zero.

3. In an electric control system, in combination, a motor and main generator, the armatures of said motor and said generator being connected in a loop circuit, said generator having a pair of field windings with characteristics such that excitation may be rapidly built up, a pilot generator having an output proportional to the speed of a machine, means to apply a predetermined potential to one field of said main generator, means to apply a variable potential to the other field of said main generator, means to compare the output of the pilot generator to the output of the main generator, and means to control said variable potential in proportion to the resultant of the comparison between the output of the main generator, causing a rapid increase in the output of said main generator, means to determine the maximum output of said main generator in proportion to the output of said pilot generator and means actuated in response to a predetermined angular movement of the armature of said motor to rapidly decrease said variable potential applied to said second generator field whereby the generator voltage is rapidly reduced, and means responsive to the output of said main generator to prevent said last-named output from decreasing beyond a predetermined value until such time as the motor armature has completed a predetermined further angular movement whereupon the output of said main generator is rapidly reduced to zero.

4. In an electric control system, in combination, a motor and a main generator, the armatures of said motor and said generator being connected in a loop circuit, said generator having a pair of field windings with characteristics such that the excitation may be rapidly built up, a pilot generator having an output proportional to the speed of a machine, a magnetic amplifier with a self-saturating controlled winding supplying one of said fields of said main generator, a first control winding on said magnetic amplifier to establish the operating condition of said amplifier, a second control winding on said magnetic amplifier supplied from said main generator and said pilot generator in opposition whereby the current in said winding, and therefore the output of said controlled winding, is proportional to the difference between the pilot generator output and the main generator output until the output of the main generator exceeds a predetermined angular movement of the motor armature to reduce the output of said controlled winding to zero, means responsive to a predetermined minimum value of output from said main generator to establish the output of said main generator at a predetermined value and means responsive to a further predetermined angular movement of said motor armature to rapidly reduce the output of said main generator to zero.

5. In an electric control system, in combination, a motor and a main generator, the armatures of said motor and said generator being connected in a loop circuit, said generator having a pair of field windings with characteristics such that the excitation may be rapidly built up, a pilot generator having an output proportional to the speed of a machine, a magnetic amplifier supplying one of said fields of said main generator, a direct current supply for energizing the other of said fields of said main generator, means to connect the output of said pilot generator and said main generator in opposition to a control winding of said magnetic amplifier whereby the output of said magnetic amplifier is proportional to the voltage by which the output of said pilot generator exceeds the output of said main generator, means responsive to a predetermined minimum difference between said outputs to control the output of said magnetic amplifier in accordance with the output of said pilot generator, means responsive to a predetermined angular motion of the armature of said motor to reduce the output of said magnetic amplifier to essentially zero, means responsive to a predetermined minimum output of said main generator to reverse the direct current supply to the other said field to produce a predetermined minimum output from said main generator, means responsive to a further angular movement of said motor armature to rapidly reduce the output of said main generator to zero.

6. In a flying shear control system, a motor armature directly coupled to a flying shear, a main generator, the armature of said generator and said motor being connected in a loop circuit, a pilot generator coupled to a mill and having an output proportional to the mill speed, a magnetic amplifier having a self-saturating controlled winding supplying a rectifier and having first, second and third controlling windings and a biasing winding supplied with direct current to determine the point of operation of said magnetic amplifier, means responsive to the presence of material at a predetermined point in said mill to initiate a timing cycle and supply a predetermined control current to said first controlling winding, means responsive to the conclusion of said timing cycle to supply a voltage proportional to the mill speed to said second controlling winding and a voltage proportional to the difference between said motor speed and said mill speed to said third controlling winding, means responsive to a predetermined speed of said motor to prevent current from flowing in said third controlling winding, means responsive to a predetermined angular movement of said motor armature to prevent current from flowing in said second controlling winding, a first field winding for said main generator supplied from said rectifier, a second field winding for said main generator supplied with direct current in such a polarity as to normally oppose said first field winding, means responsive to a predetermined minimum output from said main generator to reverse the polarity of said second field winding to maintain said generator output at a predetermined value and means responsive to a further predetermined angular movement of said motor armature to again reverse the polarity of said second field winding and rapidly reduce the output of said main generator to essentially zero.

No references cited.